United States Patent
Wang

(10) Patent No.: US 8,297,750 B2
(45) Date of Patent: Oct. 30, 2012

(54) 3D VIEWING GLASSES WITH ELECTRICAL CONNECTION

(75) Inventor: Tsung-Chin Wang, Tu-Cheng (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 124 days.

(21) Appl. No.: 13/042,458

(22) Filed: Mar. 7, 2011

(65) Prior Publication Data

US 2012/0182612 A1    Jul. 19, 2012

(30) Foreign Application Priority Data

Jan. 17, 2011 (CN) ................... 10 0 101564

(51) Int. Cl.
G02B 5/02    (2006.01)

(52) U.S. Cl. ........ 351/133; 351/140; 351/158; 359/464; 359/477

(58) Field of Classification Search .................... 351/41, 351/124–135, 140, 158; 349/13–15; 359/462, 359/464, 477
See application file for complete search history.

(56) References Cited

U.S. PATENT DOCUMENTS

| 6,067,192 A * | 5/2000 | Lichtenfield et al. | 359/480 |
| 6,799,847 B2 * | 10/2004 | Caplan | 351/128 |

* cited by examiner

*Primary Examiner* — Huy K Mai
(74) *Attorney, Agent, or Firm* — Altis Law Group, Inc.

(57) ABSTRACT

A 3D viewing glass comprises a frame, two lenses, a flexible printed circuit board, and two reinforcement elements. Each lens has an electrically interlocking element located on the inner side and adjacent to a bridge of the frame. The electrically interlocking element has an electrical adjoining plane electrically connected with the flexible printed circuit board. The electrically interlocking element and the flexible printed circuit board are further connected by the reinforcement element.

5 Claims, 3 Drawing Sheets

3D VIEWING GLASSES WITH ELECTRICAL CONNECTION

BACKGROUND

1. Technical Field

The present disclosure generally relates to 3D image display, and particularly to 3D viewing glasses with electrical connection.

2. Description of the Related Art 3D movies are gaining popularity, in which 3D viewing glasses is required for proper viewing. The 3D viewing glasses can be divided into active and passive view according to the operating mechanism. The active 3D viewing glasses are electronically powered. Commonly used active 3D viewing glasses contain a flexible printed circuit board at the temple for electrical connection. This arrangement is difficult to assemble and expensive.

Therefore, there is room for improvement in the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the 3D viewing glasses with electrical connection. Moreover, in the drawings, like reference numerals designate corresponding parts throughout the views.

DETAILED DESCRIPTION

Embodiments of 3D viewing glasses with electrical connection as disclosed are described in detail here with reference to the drawings.

Figure 1:
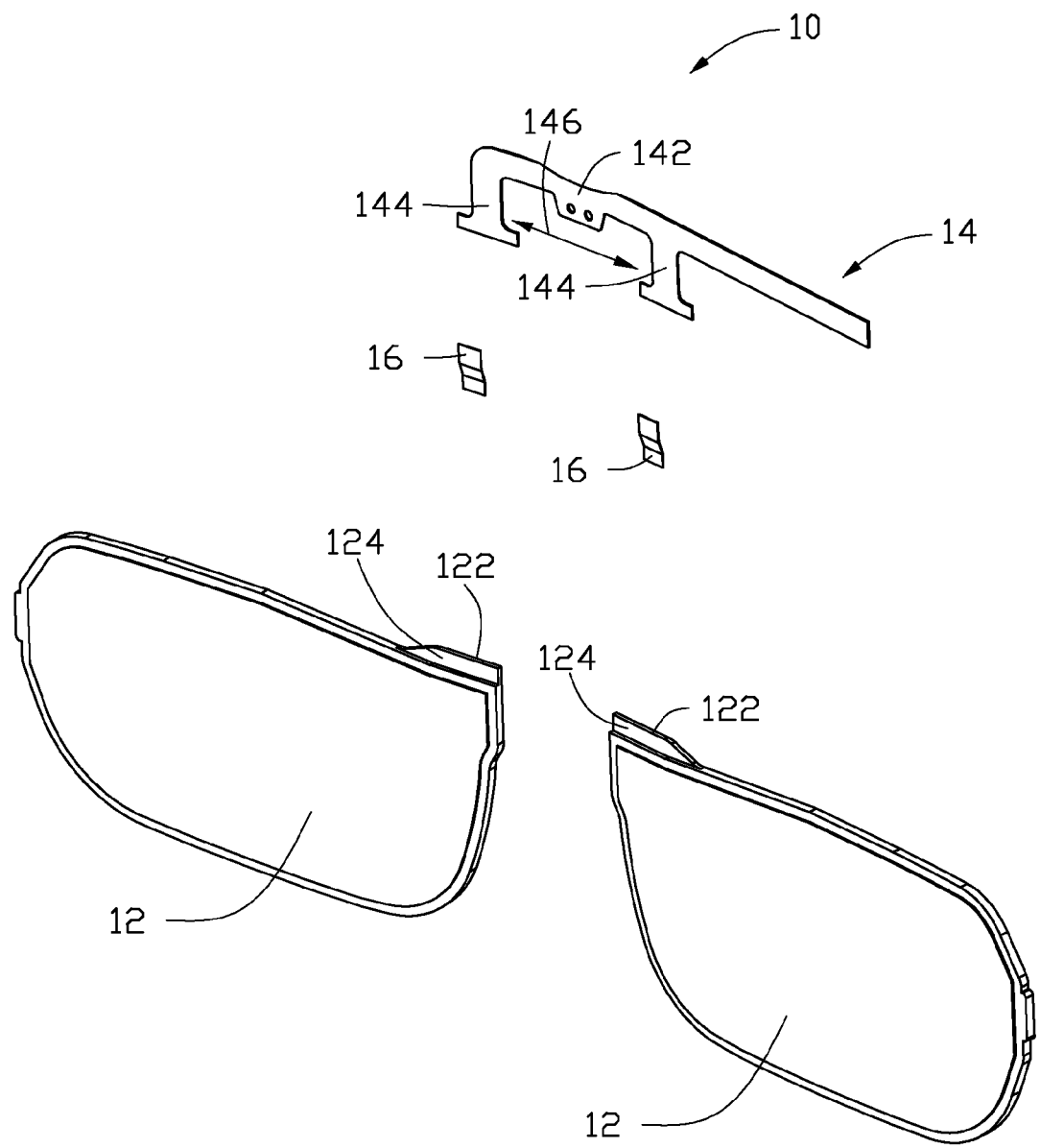
FIG. 1 is a schematic exploded view of an electrical connection in accordance with a first embodiment.
Figure 2:
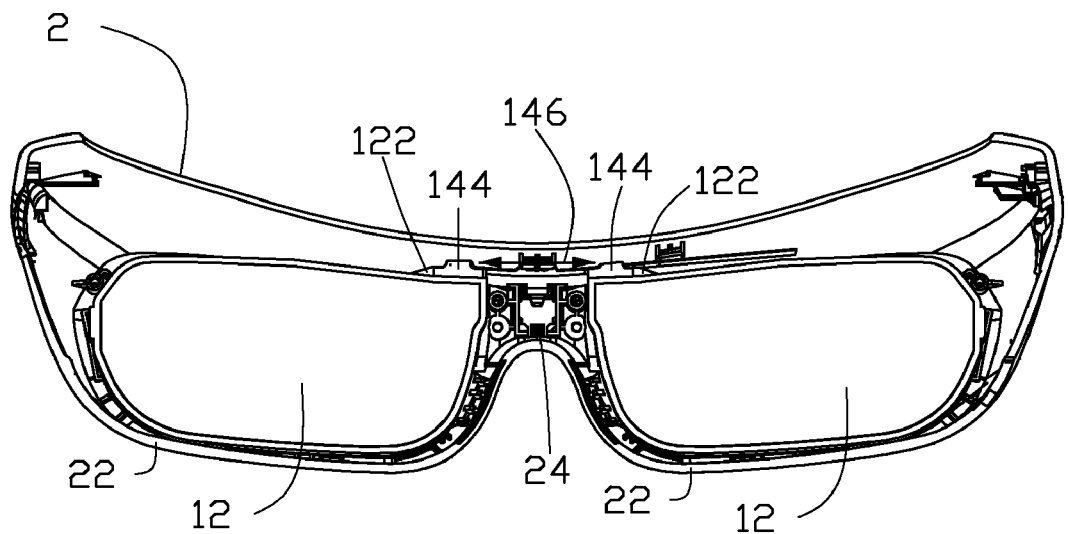
FIG. 2 is a schematic assembly view of 3D viewing glasses utilizing the electrical connection of FIG. 1.

Referring to FIG. 1 and FIG. 2, an electrical connection 10 in accordance with a first embodiment includes two lenses 12, a flexible printed circuit board 14, and at least two reinforcement elements 16. The electrical connection 10 is disposed on a frame 2 including two brackets 22 for receiving two lenses 12. A bridge 24 is arranged between the two brackets 22, separating the two lenses 12.

The lens 12 includes an electrically interlocking element 122 arranged at the inner site of the lens 12 adjacent to the bridge 24 (as shown in FIG. 2). The two lenses 12 interact with each other to produce 3D images with an electronic signal transmitted by the flexible printed circuit board 14. The flexible printed circuit board 14 includes a main board 142 and two adjoining boards 144. The two adjoining boards 144 extend from the main board 142 corresponding to the two electrically interlocking element 122 and electrically connect with the two electrically interlocking element 122. An interval 14 defined therein between the two adjoining boards 144 is wider than the width of, and receives, the bridge 24.

Figure 3:
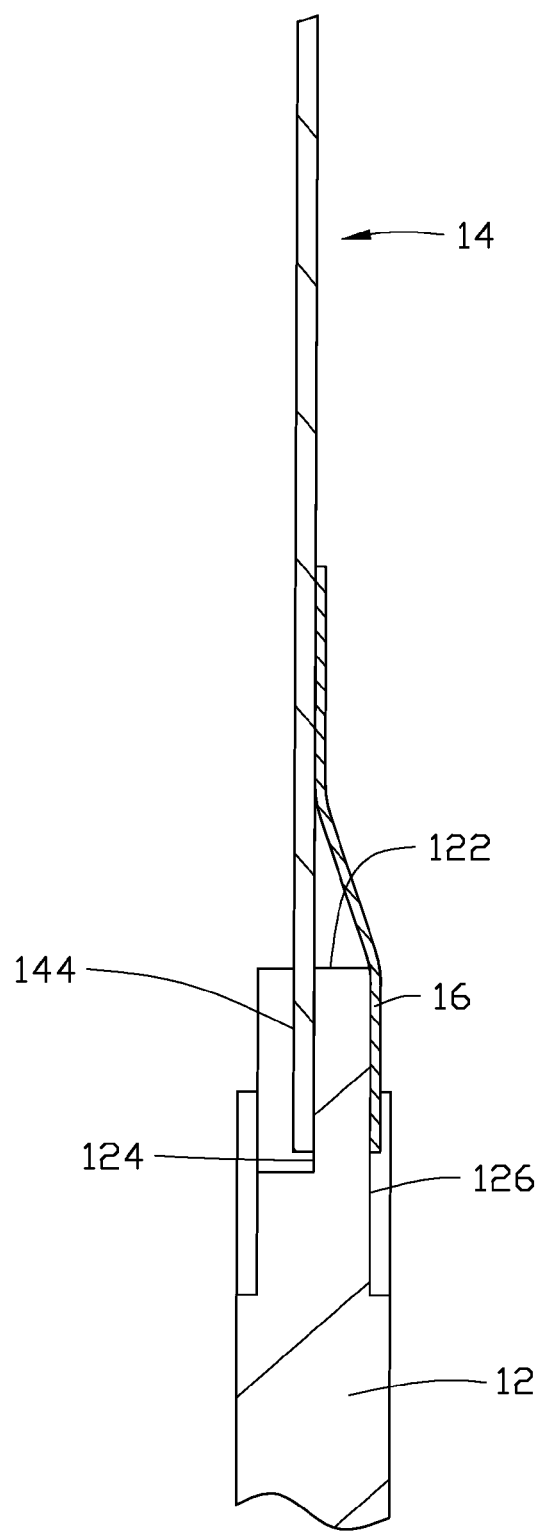
FIG. 3 is a schematic cross section of the electrical connection of FIG. 1.

Referring to FIG. 3, the electrically interlocking element 122 includes an electrical adjoining plane 124 and a fixing plane 126. The electrical adjoining plane 124 is arranged corresponding to the fixing plane 126 and electrically connecting with the flexible printed circuit board 14. The fixing plane 126 connects with the reinforcement element 16. One end of the reinforcement element 16 connects with the fixing plane 126, and the other end of the reinforcement element 16 connects with the flexible printed circuit board 14. The reinforcement element 16 fixes the electrically interlocking element 122 and the flexible printed circuit board 14 from detachment.

The electrically interlocking elements 122 of the two lenses 12 are arranged spacing the bridge 24 so that the area and thickness of the electrically interlocking element 122 are decreased significantly. The 3D viewing glasses utilizing electrically interlocking element 122 as disclosed are easily assembled and of reasonable cost.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A 3D viewing glass comprising:
a frame containing two lenses;
a flexible printed circuit board; and
two reinforcement elements, wherein each lens contains an electrically interlocking element adjacent to a bridge of the frame, the electrically interlocking element contains an electrical adjoining plane electrically connecting with the flexible printed circuit board and connected by each of the two reinforcement elements.

2. The 3D viewing glass of claim 1, wherein the flexible printer circuit board includes a main board and two adjoining boards, the two adjoining boards extend respectively from the main board corresponding to the electrically interlocking element and electrically connecting with the electrically interlocking element.

3. The 3D viewing glass of claim 2, wherein the two adjoining boards define an interval therein between with a distance larger than the width of the bridge.

4. The 3D viewing glass of claim 1, wherein the electrically interlocking element includes a fixing plane corresponding to the electrical adjoining plane and connecting with one end of one of the two reinforcement elements.

5. The 3D viewing glass of claim 4, wherein the other end of the one of the two reinforcement elements connects with the flexible printed circuit board.

* * * * *